(12) United States Patent
Begen et al.

(10) Patent No.: US 10,142,387 B2
(45) Date of Patent: Nov. 27, 2018

(54) DISTRIBUTED COORDINATION OF NETWORK ELEMENTS FOR PACKET ENCAPSULATION

(71) Applicant: Cisco Technology, Inc., San Jose, CA (US)

(72) Inventors: Ali C. Begen, London (CA); William C. Ver Steeg, Alpharetta, GA (US)

(73) Assignee: Cisco Technology, Inc., San Jose, CA (US)

(*) Notice: Subject to any disclaimer, the term of this patent is extended or adjusted under 35 U.S.C. 154(b) by 204 days.

(21) Appl. No.: 14/718,807

(22) Filed: May 21, 2015

(65) Prior Publication Data
US 2015/0264101 A1   Sep. 17, 2015

Related U.S. Application Data

(62) Division of application No. 12/566,007, filed on Sep. 24, 2009, now abandoned.

(51) Int. Cl.
| | |
|---|---|
| H04L 29/06 | (2006.01) |
| H04L 29/14 | (2006.01) |
| H04N 21/2343 | (2011.01) |
| H04N 21/236 | (2011.01) |
| H04N 21/643 | (2011.01) |
| H04N 21/6437 | (2011.01) |
| H04N 19/00 | (2014.01) |
| H04L 21/00 | (2006.01) |

(52) U.S. Cl.
CPC ........ *H04L 65/602* (2013.01); *H04L 65/4069* (2013.01); *H04L 65/4076* (2013.01); *H04L 65/607* (2013.01); *H04L 69/14* (2013.01); *H04L 69/40* (2013.01); *H04N 21/23605* (2013.01); *H04N 21/234309* (2013.01); *H04N 21/6437* (2013.01); *H04N 21/64322* (2013.01); *H04L 21/00* (2013.01); *H04N 19/00* (2013.01)

(58) Field of Classification Search
CPC .... H04N 19/00; H04N 21/00; H04N 21/6437; H04N 21/64; H04L 5/00
See application file for complete search history.

(56) References Cited

U.S. PATENT DOCUMENTS

| | | |
|---|---|---|
| 7,506,194 B2 | 3/2009 | Appanna et al. |
| 7,515,525 B2 | 4/2009 | Appanna et al. |
| 7,751,311 B2 | 7/2010 | Ramaiah et al. |

(Continued)

FOREIGN PATENT DOCUMENTS

WO    WO/2009/112371   *   9/2009

*Primary Examiner* — Tom Y Chang
(74) *Attorney, Agent, or Firm* — Edell, Shapiro & Finnan, LLC (57) ABSTRACT

In one embodiment, an encapsulator device receives a source stream of encoded packets in a first transport format and converts the source stream to packets of an output stream in a second transport format for communication over a data network. The encapsulator device generates a mapping stream with information indicating which packets in the source stream are used to generate the output stream. The output stream of the encapsulator device is coordinated with the output stream of other encapsulator devices by sending the mapping stream to the other encapsulator devices in the network. The other encapsulator devices use the mapping stream to generate identical output streams.

20 Claims, 6 Drawing Sheets

(56) References Cited

U.S. PATENT DOCUMENTS

| | | | |
|---|---|---|---|
| 2004/0158872 A1* | 8/2004 | Kobayashi | H04L 12/1886 |
| | | | 725/120 |
| 2006/0062200 A1 | 3/2006 | Wang et al. | |
| 2006/0262716 A1 | 11/2006 | Ramaiah et al. | |
| 2007/0115969 A1 | 5/2007 | Isnardi | |
| 2009/0252227 A1* | 10/2009 | Nepomucenoleung | ................... |
| | | | H04N 19/107 |
| | | | 375/240.13 |
| 2010/0290428 A1 | 11/2010 | Fujita | |
| 2011/0051871 A1* | 3/2011 | Poulain | H04H 20/18 |
| | | | 375/356 |
| 2012/0047278 A1* | 2/2012 | Groos | H04L 65/605 |
| | | | 709/231 |

* cited by examiner

FIG. 6 ary of U.S. Patent No. 10,142,387 B2

DISTRIBUTED COORDINATION OF NETWORK ELEMENTS FOR PACKET ENCAPSULATION

CROSS-REFERENCE TO RELATED APPLICATIONS

This application is a divisional application of U.S. application Ser. No. 12/566,007, filed Sep. 24, 2009, the entirety of which is incorporated herein by reference.

TECHNICAL FIELD

The present disclosure relates to distribution of video streams.

BACKGROUND

Distribution of video information over networks, such as a wide area distribution network (i.e., the Internet), involves encapsulating raw video into a streaming format that is suitable for transmission over the network. For example, the raw video may be in a MPEG format, such as an MPEG2-transport stream (MPEG2-TS) and it is desirable to produce a real-time transport protocol (RTP) stream that is compatible with the RFC3550 standard. This is an important task as many of existing headend equipment deployments cannot output RTP streams. However, telecommunication service providers need the RTP encapsulation function in order to serve advanced features for improving video quality experience. Therefore, the service providers are required to perform RTP encapsulation somewhere in the network before secondary distribution.

It is often desirable to have redundant (and identical) copies of the video stream so that the end-to-end system does not have a single point of failure. A video encoder (with N-1 redundancy) has two Ethernet outputs, feeding two encapsulator devices. The encapsulator devices are not able to generate identical streams because the RTP identifiers such as the sequence numbers and timestamps are not coordinated between the devices. Different encapsulator devices may produce totally different streams even for the same content.

DESCRIPTION OF EXAMPLE EMBODIMENTS

Overview

In one embodiment, each of a plurality of encapsulator devices receives a source stream of encoded packets in a first transport format to be converted to packets of an output stream in a second transport format for communication over a data network. Each encapsulator device generates one or more fundamental identifying characteristics for the output stream based on information contained in one or more fields of a packet in the source stream so that the packets in the output stream generated by each of the encapsulator devices from the source stream are coordinated with respect to each other. For example, each encapsulator device is configured to generate a packet sequence number and a timing reference for each packet in the output stream based on information in one or more fields of a packet in the source stream. Furthermore, each encapsulator device is configured to generate a source stream identifier for the output stream from information contained in one or more packets of the source stream such that the output stream from each encapsulator device has the same source stream identifier for the same incoming source stream of encoded packets in the first transport format.

In another embodiment, an arbitrary one (referred to as a "first") of the plurality of encapsulator devices is configured to generate a preliminary encapsulation and packetization of the packets in the source stream into packets for the output stream of packets in the second transport format. This first encapsulator device transmits information describing the preliminary encapsulation and packetization to at least one other encapsulator device in the plurality of encapsulator devices. The other encapsulator devices receive the information describing the preliminary encapsulation and packetization from the first encapsulator device, and generate an output stream of packets in the second transport format based on packets of the source stream and the information describing the preliminary encapsulation and packetization.

Example Embodiments

Figure 1:
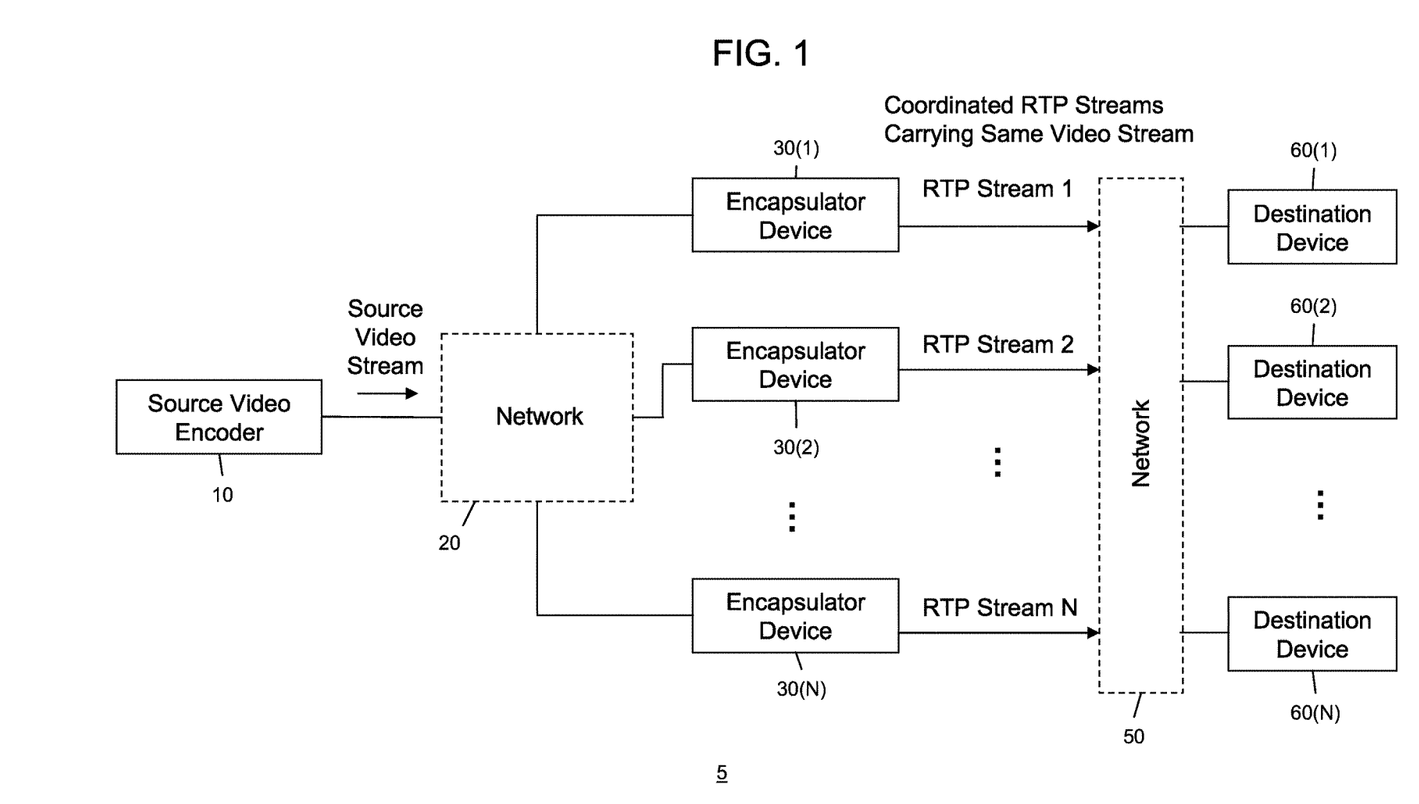
FIG. 1 is a block diagram illustrating a video distribution system comprising a plurality of encapsulator devices each configured to perform a coordinated packet encapsulation process according to the techniques described herein.

Referring first to FIG. 1, an example block diagram is shown for a video distribution system 5 to which the techniques described herein may be useful. In particular, there is a source video encoder 10 that generates a source stream of video (containing audio) data. For example, the source video encoder 10 may reside or be associated with a service provider's headend facilities. The source video encoder 10 may be configured to generate a source stream for a single channel, e.g., a specific television (TV) program or channel. The source stream comprises encoded video packets in accordance with a first transport format. For example, the source stream comprises raw user datagram protocol (UDP) encapsulated MPEG2-TS packets over Internet Protocol (IP) for a given program or channel.

The source stream is transmitted over a network 20, such as the Internet or one or more proprietary and closed networks. In another form, the network 20 is a hybrid fiber coax (HFC), coax or other similar network.

In order to serve certain features or functions, the source stream needs to be converted into a transport stream according to a second transport format, an example of which is the real-time transport protocol (RTP) format. The RTP format is a standardized packet format for delivering audio and video over the Internet. The RTP is used extensively in communication and entertainment systems that involve streaming media, such as telephony, video/teleconferencing applications and web-based push-to-talk features, Internet TV (IPTV), etc. There is a plurality of encapsulator devices 30(1)-30(N) connected to the network 20, each of which receives the source stream in the first transport format and converts it to an output stream in the second transport format. An example of an encapsulator device is the Digital Content Manager device, manufactured and sold by Cisco Systems, Inc.

Without coordination/synchronization among the encapsulator devices 30(1)-30(N), the produced output streams, e.g., RTP streams, will not necessarily be identical even though they are processing the same source stream. There are significant advantages if the plurality of different encapsulator devices produce identical output (e.g., RTP) streams for a given input source stream. Moreover, centrally managing the encapsulator devices 30(1)-30(N) within an operator's network is not desirable. A distributed coordination solution is preferable because it offers greater scalability.

The output RTP streams 1-N produced by corresponding ones of the encapsulator devices 30(1)-30(N) may be distributed over a network 50 to corresponding destination devices 60(1)-60(N). The network 50 may be the Internet, and may be the same network as that identified by reference numeral 20 in FIG. 1. Each RTP stream is identified by a synchronization source (SSRC) number. Similar to port number(s) assigned to a specific MPEG2-TS, the SSRC number can be set (globally, if desired) by an operator.

Each encapsulator device 30(1)-30(N) is configured to encapsulate packets in the source stream to packets in an output stream, e.g., an RTP stream, such that the output streams generated and output by devices 30(1)-30(N) for the same source stream (and thus carrying the same video stream) are coordinated. That is, one or more fundamental identifying characteristics for each of the RTP streams is the same across RTP streams 1-N output by encapsulator devices 30(1)-30(N), respectively. An example fundamental identifying characteristic is a packet sequence number for each packet in the output streams. An example of another fundamental identifying characteristic is timestamps or in general a timing reference for packets in the output streams. Still another fundamental characteristic is the SSRC number (stream source identifier) that is assigned to each output RTP stream. It is desirable to configure each encapsulator device 30(1)-30(N) to generate for the same source stream multiple output streams having the same fundamental characteristics described above.

For example, suppose that the following is the input to the encapsulator devices 30(1)-30(N):

. . . TS_14 . . . TS_9 TS_8 TS_7 . . . TS_2 TS_1

Without loss of generality, seven MPEG2-TS packets can be grouped to create a single RTP packet. Thus, the output stream comprises:

. . . RTP_2 RTP_1

A goal of the techniques described herein is to have each independent encapsulator device 30(1)-30(N) produce RTP packets with identical payloads, sequence numbers and (if possible) timestamps. As a result, the operators can easily correlate events/feedback, such as RTP Control Protocol (RTCP) reports, concerning the RTP streams generated by different encapsulator devices. The resulting RTP-level monitoring provides more visibility throughout the operator's network.

The techniques described herein are applicable to any device that is configured to perform RTP encapsulation for an incoming stream. In some cases, a secondary RTP encapsulation may be needed for an incoming RTP stream.

There are three types of synchronization or coordination considered, though there may be others as well. They are RTP streams with:

Identical sequence numbers (seqnums), but their timestamps can be different;

Identical timestamps, but their seqnums can be different; and

Identical seqnums and timestamps.

In each case, of course, the RTP payloads should be identical; otherwise, synchronization is not of much use.

In general, each encapsulator device receives the source stream without any loss and with packets in order. If this is not the case, the encapsulator device may use some additional methods (such as live/live where the same stream is received from different networks and one stream can be used if the other fails, forward error correction, etc.) to recover the missing packets before RTP encapsulation. If the incoming packets of the source stream are out of order, some MPEG-level checking analysis, for example, may be employed at an encapsulator device to put them back in order.

Another approach is that if a missing packet of the source stream cannot be recovered, the corresponding RTP packet in the output stream can be generated with a fewer number of source stream packet(s). This keeps an unsynchronized portion of the source stream to a limited number of packets. Similarly, if a UDP packet which carries seven MPEG2-TS packets is missing, the corresponding RTP packet in the output stream can be skipped all together. That is, there will be a jump in the RTP seqnums. In this way, the destination devices will indeed know that there has been data loss. This situation is described in more detail hereinafter in conjunction with FIG. 6.

Figure 2:
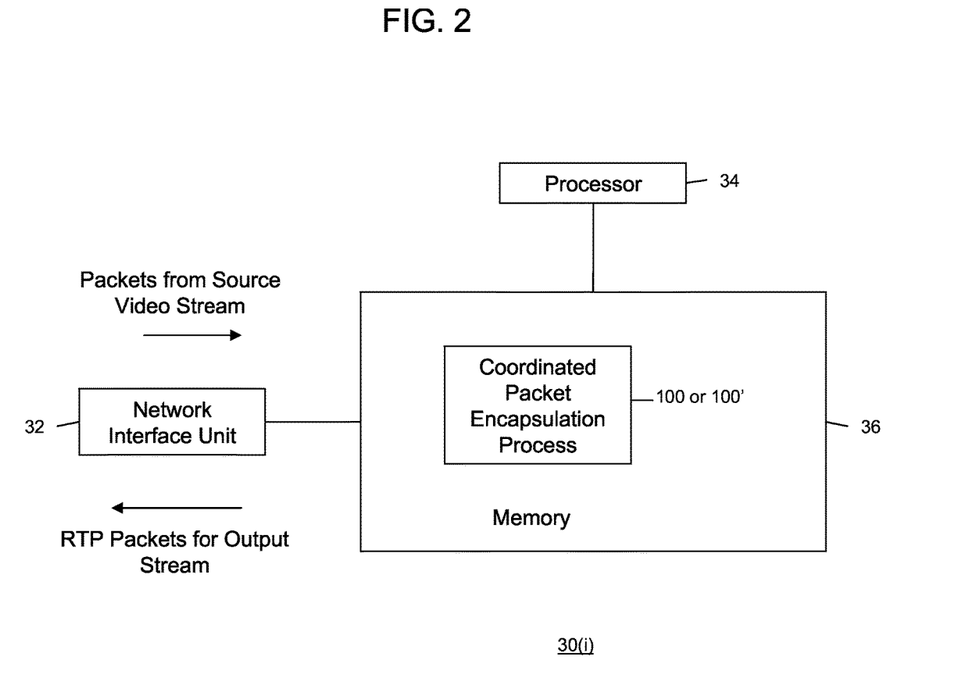
FIG. 2 is a block diagram of an encapsulator device configured to perform a coordinated packet encapsulation process.

Reference is now made to FIG. 2. FIG. 2 shows a block diagram of an encapsulator device generally identified at reference numeral 30(i) to indicate that each of the encapsulator devices 30(1)-30(N) has a similar structure/configuration. Each encapsulator device comprises a network interface unit 32 that is configured to receive and transmit data (packets) over a network, such as via network 20 and via network 50 (which again, may be the same network). In particular, the network interface unit 32 is configured to receive the incoming source stream and to transmit RTP packets as part of the output stream. Each encapsulator device comprises a processor 34, such as a microcontroller or microprocessor, digital signal processor, etc., and a memory 36. The memory 36 stores instructions that, when executed by the processor 34, cause the processor 34 to perform various functions for the encapsulator device 30(i). In particular, the memory 36 is a tangible memory medium, such as random access memory (RAM) or read only memory (ROM), which is encoded with instructions for coordinated packet encapsulation process logic 100 or 100'. In another form, the functions of the process logic 100 are implemented with fixed digital logic, such as an application specific integrated circuit, or digital logic in the form of a programmable logic device, such as a programmable gate array device. A flow chart for a first form of the coordinated packet encapsulation process logic designated by reference numeral 100 is described hereinafter in conjunction with FIG. 3 and a flow chart for a second form of the coordinated packet encapsulation process logic designated by reference numeral 100' is described hereinafter in conjunction with FIG. 4.

Figure 3:
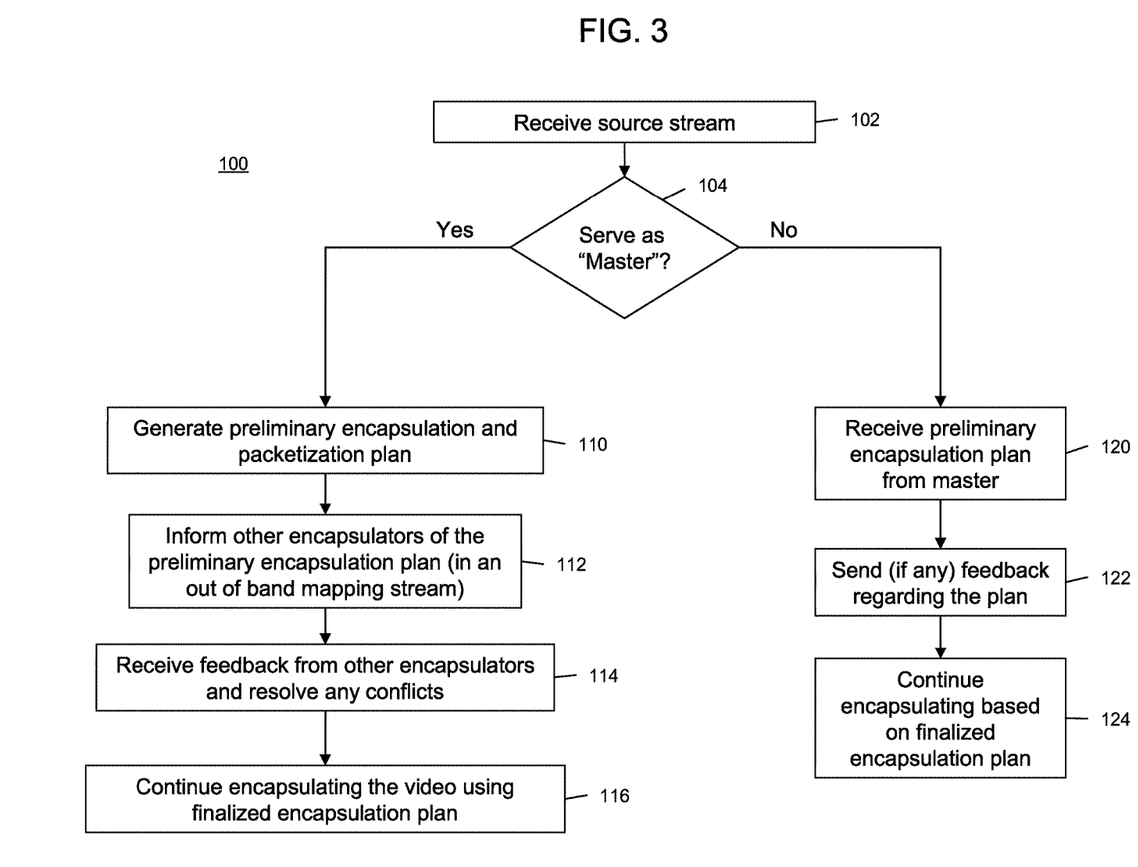
FIG. 3 is a flow chart depicting the coordinated packet encapsulation process according to a first embodiment.

Referring now to FIG. 3, a first form of the coordinated encapsulation process logic 100 is described. This form is particularly usefully when the encapsulation devices 30(1)-30(N) are co-located and can communicate with each other to coordinate how each device encapsulates the RTP packets. For example, the encapsulation devices 30(1)-30(N) can communicate with each other over the network 50 shown in FIG. 1. In this form of the process logic 100, both timestamps and seqnums can be generated in a coordinated fashion for multiple output RTP streams.

At 102, each encapsulation device receives the source stream of encoded packets in a first transport format, ultimately to be converted to an output stream of packets in a second transport format, e.g., the RTP format. At 104, a determination is made as to whether the encapsulation device is to serve as a "master" with respect to other encapsulation devices in connection with setting up basic parameters for the encapsulation process to be used for all the encapsulation devices. When the encapsulation device in which the logic 100 is running is to serve as the master then the functions on the left-hand side of FIG. 3 are performed, and otherwise, the functions on the right-hand side of FIG. 3 are performed, as indicated by the decision block 104.

When an encapsulation device is to serve as the master, then at 110, the master encapsulator device generates a preliminary encapsulation and packetization plan for converting the encoded video packets in the first transport format into an output stream of packets in the second transport format. The preliminary encapsulation and packetization plan is a "trial" encapsulation and packetization. The master encapsulator device builds RTP packets from the packets in the source stream and a mapping stream that describes which packets in the incoming source stream went into building which packets in the output stream. For example, the mapping stream indicates which MPEG2-TS cell (packet identifier (PID), modulo 7 continuity counter and Payload Unit Start indicator) went into which RTP packet. The master encapsulator device may concatenate these record streams together and compress them for efficiency.

At 112, the master encapsulator device sends a message to the other encapsulator devices, the message comprising information describing the preliminary encapsulation and packetization plan. This message is transmitted as an "out-of-band" message and is referred to herein as an "out-of-band mapping stream". At 114, the master encapsulator device receives feedback, if any, sent from other encapsulator devices as to the preliminary encapsulation and packetization plan and resolves any conflicts or issues raised in the received feedback messages. At 116, the master encapsulator device continues encapsulating the incoming packets into packets for the output stream using the finalized encapsulation and packetization plan.

The right-hand side of the flow chart in FIG. 3 is now described to explain how the other encapsulator devices operate with respect to the preliminary encapsulation and packetization plan. At 120, each of the other encapsulator devices receives the preliminary encapsulation and packetization plan from the master encapsulator device. At 122, each encapsulator device evaluates the plan and sends feedback, if any, to the master encapsulator device in the form of a feedback message. At 124, the other encapsulator devices continue encapsulating the packets from the source stream into packets for the outputs stream according to the preliminary (or finalized) encapsulation and packetization plan. The other encapsulator devices know the PID and MPEG continuity counter of every cell, and while they are receiving a complete source stream, they can synchronize the in-band video packet flow with the out-of-band RTP mappings. If an encapsulator device determines that it is missing data, it can either "leave a hole" or send a message to the master encapsulator device to request the missing data (or use forward error correction or other means to recover the missing data). Similarly, if one of the other encapsulator devices has data that the master encapsulator device does not have, the master device could send a message to the other devices advising them to "leave a hole" or requesting one of the other encapsulator devices to send the missing data to the master encapsulator device.

The process 100 shown in FIG. 3, at a high level, is a 2-pass encapsulation process in which the master encapsulator device does a preliminary encapsulation of the data, informs its peers about the encapsulation, and resolves any conflicts in the encapsulation. This may be achieved through the master-slave approach described above, or a peer-to-peer approach.

Figure 4:
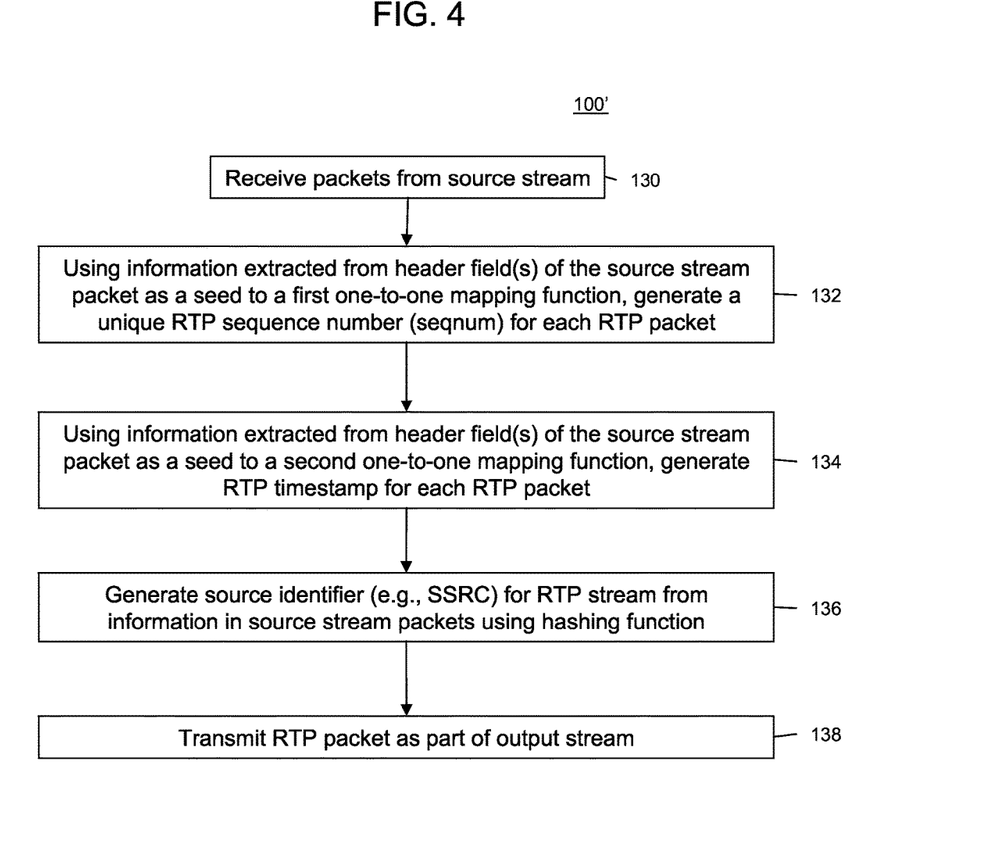
FIG. 4 is a flow chart depicting the coordinated packet encapsulation process according to a second embodiment.

Turning now to FIG. 4, the second form of the coordinated RTP encapsulation process logic 100' is now described. This approach does not require any communication between encapsulator devices 30(1)-30(N). Each operates autonomously as described hereinafter. Consequently, this approach is useful whether or not the encapsulator devices are co-located. Generally, this approach involves each encapsulator device generating one or more fundamental identifying characteristics for the output stream in the second transport format based on information contained in one or more fields of a packet in the source stream so that the packets in the output stream generated by each of the encapsulator devices from the source stream are coordinated with respect to each other.

At 130, the source stream of packets in the first transport format is received. At 132, using information extracted from one or more header fields of the source stream packets as a seed to a one-to-one mapping function, a unique RTP seqnum is generated for each RTP packet. The information from the one or more header fields may comprise any combination of the fields in the header of the source stream packets, such as MPEG2-TS preamble information. Since each encapsulator devices uses the same one-to-one mapping function, each encapsulator apparatus will generate the same seqnums from the same header field information in the source stream packets. Thus, the output stream generated by each encapsulator device from the same source stream is coordinated with respect to seqnums. Generally, determining only the initial seqnum is essential. If the initial seqnum is coordinated across the encapsulator devices, the subsequent seqnums for subsequent packets can be generated from the initial seqnum in a straightforward manner. At the end, the same sequence numbers are generated for packets in the output streams which carry the same data even if the respective encapsulator devices start generating sequence numbers based on different packets from the source stream.

It is noteworthy that for security reasons, the RFC 3550 standard suggests to choose a random initial seqnum. Fortunately, the seqnum produced by aforementioned one-to-one mapping function will appear "random" to a hacker. Likewise, the selection of which seven MPEG2-TS packets are grouped together to create an RTP packet is determined by this mapping function.

At 134, using a second and different one-on-one mapping function (different from the one used at 132 for the seqnums) based on information in the header fields of the source stream packets, timestamps are generated for RTP packets. For example, the Program Clock Reference (PCR), Presentation Time Stamp (PTS), and/or Decoding Time Stamp (DTS) information from the header fields of an MPEG2-TS packet may be used to generated the RTP timestamp using a second one-to-one mapping function. Again, similar to seqnums, the initial timestamp is important. Once the initial timestamp is determined, timestamps for subsequent RTP packets may be filled in based on the initial timestamp and a clock rate of the content of the packets in the source stream. Alternatively, the PCR/PTS/DTS information is used as input to the second mapping function to determine the timestamps for the successive packets.

Figure 5:
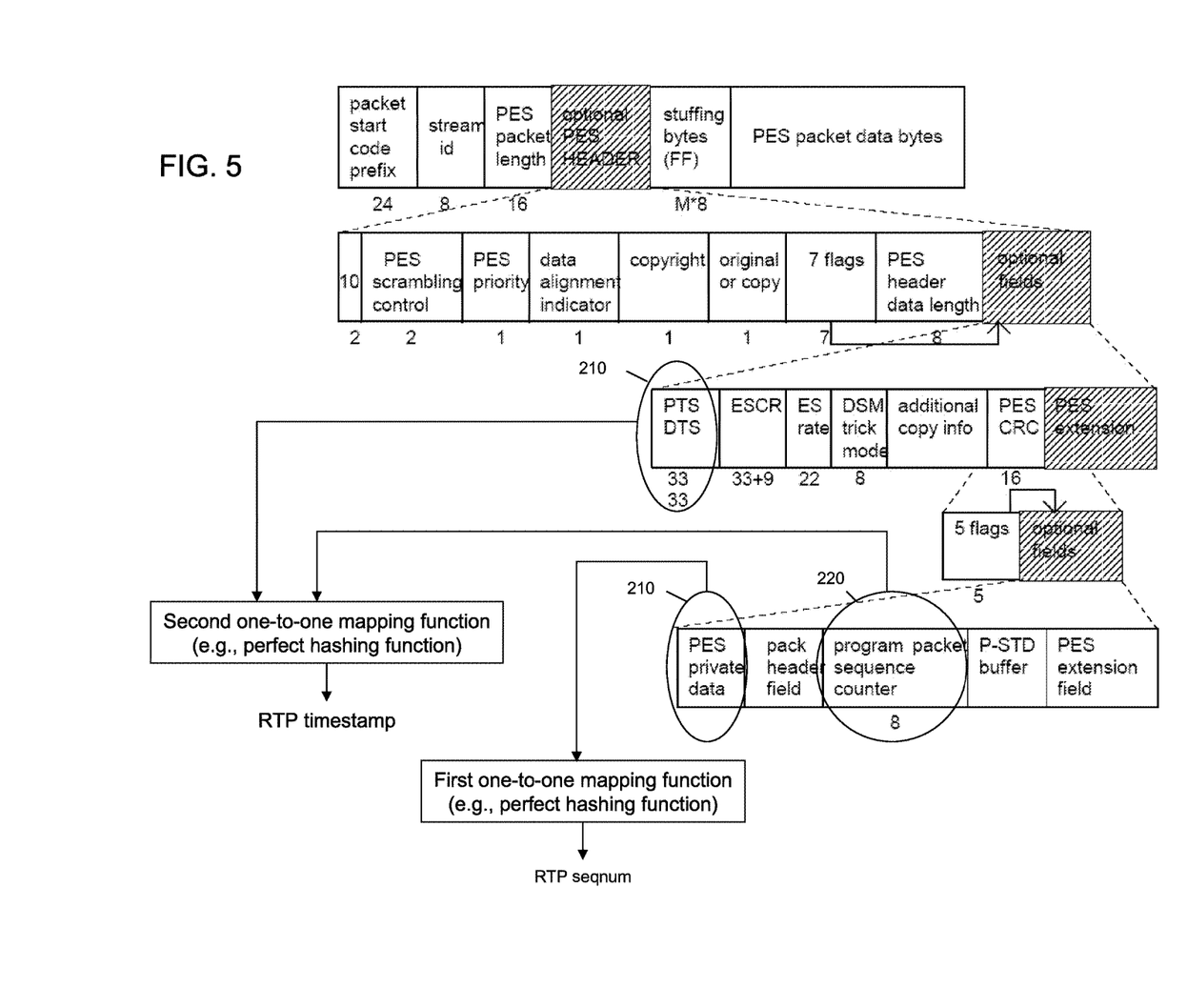
FIG. 5 is a diagram depicting an example of one or more fields of a source stream packet from which information is used to generate parameters for the output stream packets.

Turning to FIG. 5, a diagram is shown for several header fields of an MPEG2-TS packet. FIG. 5 shows that the input to the first one-to-one mapping function comprises, for example, PES private data field 200, that is used to generate the RTP seqnums for RTP packets.

FIG. 5 also shows that the input to the second one-to-one mapping function comprises, for example, the PTS and DTS field 210 and/or the PCR field 220 are used as input to a second one-to-one mapping function to generate the RTP seqnum for an RTP packet. While FIG. 5 shows that different fields of a source stream packet are used to generate the packet sequence number and the timestamp, it should be understood that the same fields may be used to generate both the packet sequence number and the timestamp, albeit with different one-to-one mapping functions as indicated by the first and second one-to-one mapping functions referred to in FIG. 5.

Examples of one-to-one mapping functions are perfect hashing functions that map one or more input values to a unique output value such that the same input value(s) is/are always mapped to the same output values. However, a perfect hashing function is not required. Any mapping function that makes a one-to-one mapping of inputs to outputs is suitable and the function need not also perform a one-to-one mapping of outputs to inputs.

Referring back to FIG. 4, at 136, a source identifier, e.g., an SSRC number, is generated for the output stream of RTP packets from information in the incoming source stream packets. The SSRC number is an identifier for the overall RTP stream. The SSRC number is unique within an RTP session, which means that different RTP streams in different RTP sessions may share the same SSRC value (32 bits). The encapsulator devices create the same SSRC numbers for the same incoming source stream. For example, in IPTV distribution systems, each channel of programming is offered on a source-specific multicast (SSM) session, and is identified by the address pair (S, G), where S is the source IP address and G is the destination multicast address. In the IPv4 standard, S and G are both 32 bits and in IPv6 S and G are both 128 bits. In practice, S may be common to multiple channels, but G varies and is unique per channel. Thus, when IPTV channel is received at 130, what is actually received is a multicast session for a channel of video programming, wherein each channel of video programming is identified by a source address and a destination multicast address such that the source address may be common across multiple channels and in some circumstances the destination address is unique for each channel. By applying a one-to-one mapping (e.g., hashing) function to the destination multicast address G, an SSRC number is generated for the RTP stream for each channel. In the event that the destination multicast address G is shared, using only G as input to a hashing function produces the same SSRC number. In that case, the source address S values will be different. Consequently, a combination of the source address S values and destination multicast address values can be used as input to hashing function to generate the SSRC number for RTP streams. The SSRC computation function 136 need be made only once for a given RTP stream, but the same SSRC number is included in all RTP packets for that stream, and for all the RTP streams produced by the encapsulator devices 30(1)-30(N) when generated from the same source stream.

Still referring to FIG. 4, at 138, RTP packet, containing the seqnum generated at 132, the timestamp generated at 134 and the SSRC generated at 136 (for that packet or for a prior packet that is part of the same RTP stream) is transmitted as part of the output RTP stream.

Figure 6:
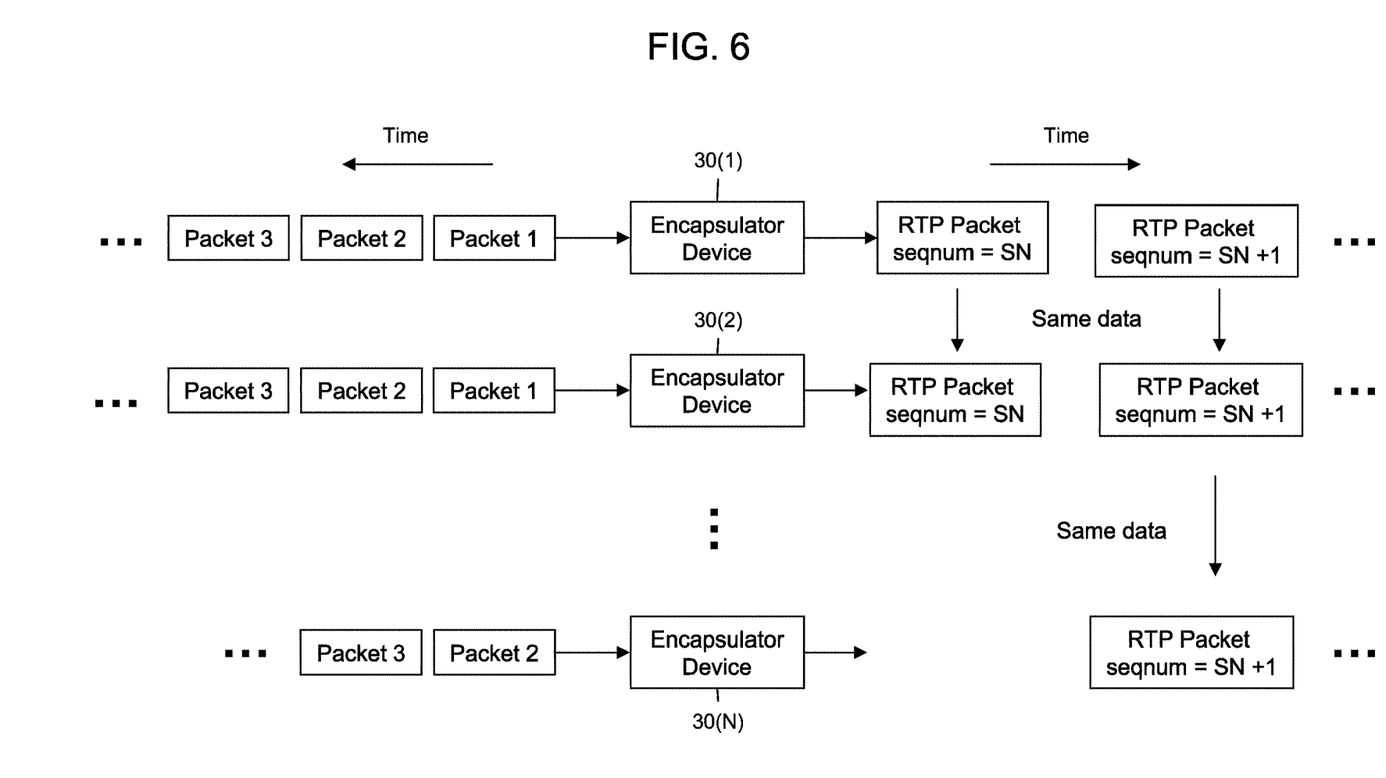
FIG. 6 is a diagram further depicting functions of the coordinated packet encapsulation process of the second embodiment.

Reference is now made to FIG. 6 to illustrate another aspect of the techniques described herein. As should be apparent from the foregoing description of FIGS. 4 and 5, in order for each encapsulator device to generate the same RTP seqnum and timestamp, they need to use the same packet as the "seed" for the mapping functions. Actually, if all the encapsulator devices receive the same first packet, by default they will all use that packet as the seed and produce identical RTP streams. However, it cannot be guaranteed that all the encapsulator devices will receive the same first packet (due to loss or other reasons). They may receive different (first) packets. If the seed is different, the output of the mapping function will be different.

For example, as shown in FIG. 6, Packet 1 is the first packet to be received at encapsulator devices 30(1) and 30(2), whereas Packet 2 is the first packet to be received at encapsulator device 30(N). Consequently, the first RTP packet output by encapsulator device 30(1) has a seqnum=SN as does the first RTP packet output by encapsulator device 30(2). The next RTP packet output by encapsulator devices 30(1) and 30(2) have a seqnum=SN+1. However, the first RTP packet output by encapsulator device 30(N) has a seqnum=SN+1 because the first packet it received, from which it generated a seqnum, is packet 2 and not Packet 1. Nevertheless, the RTP packets with the same seqnums out of encapsulators 30(1), 30(2) and 30(N) will carry the same data, which is most important.

Generally, when an encapsulator device uses information from a source stream packet as a seed, it continues to monitor the incoming source stream packets and makes any necessary adjustments in case there is a gap (i.e., loss) of a source stream packet in the sequence of source stream packets. The encapsulator device may use fields of information from new source stream packets to produce the one or more fundamental characteristics.

In summary, the techniques described herein are designed not to coordinate all the packet flows going thru the encapsulator. Depending on the content source, encoder settings, etc., the PCR/PTS/DTS values of different source stream packet flows generated by different source video encoders will be different. Rather, the techniques are directed to coordinating the RTP streams produced by different encapsulator devices from the same source stream. Seqnum coordination is a lot more useful in RTP-level monitoring/ processing and stream switching as that is more apparent in RTCP reports and RTP-level processing. However, timestamp coordination may also be desired.

Again, the techniques described herein provide allow for generation of identical RTP stream by different encapsulator devices (for the same raw source stream feed, e.g., MPEG2-TS feed) in a distributed fashion. When all the RTP streams produced from a source stream feed are identical in a service provider network, correlation of the events and feedback (such as RTCP reports) associated with RTP streams generated by different devices becomes much easier. This increases the overall benefit of RTP-level monitoring. Also, when multiple RTP streams are generated for redundancy purposes, having them identical will make recovery much faster and more reliable.

There are still other benefits to the techniques described herein. When one encapsulator device has a failure, another encapsulator device can take over for it as a backup and thus becomes the source for the RTP stream. Since their output streams were coordinated, the destination devices for the failed encapsulator device will experience minimal disruption from the failure. Moreover, two encapsulator devices can be configured to perform live/live transmission whereby both supply streams simultaneously, and duplicate suppression may be performed on the streams before they reach the receivers. If one stream fails, the packet transmission to the destination devices will be nevertheless be perfect (assuming the coordination between the streams was perfect).

The one-to-one mapping function referred to above converts a bit pattern from one or more fields of source stream packet into a bit pattern representing one or more of the fundamental identifying characteristics (e.g., packet sequence number, timing reference and source stream identifier) in the packets of the output stream. Since each encapsulator device is configured to use the same one-to-one mapping function to generate corresponding fundamental identifying characteristics for the output stream, this ensures that each encapsulator device will generate an output stream having the same fundamental characteristics from the same source stream.

Although the techniques are illustrated and described herein as embodied in one or more specific examples, it is nevertheless not intended to be limited to the details shown, since various modifications and structural changes may be made therein without departing from the scope of the and range of equivalents of the claims.

What is claimed is:

1. A method comprising:
   at each of a plurality of encapsulator devices comprising a master encapsulator device and one or more slave encapsulator devices, receiving a source stream of encoded packets in a first transport format;
   at the master encapsulator device, generating a preliminary plan for converting the encoded packets of the source stream to packets of a master output stream in a second transport format for communication over a data network, wherein the preliminary plan identifies a plurality of the encoded packets of the source stream corresponding to each packet of the master output stream;
   at the master encapsulator device, generating a preliminary mapping stream that comprises information identifying the plurality of the encoded packets of the source stream that are used to generate each of the packets of the master output stream according to the preliminary plan;
   sending the preliminary mapping stream from the master encapsulator device to the one or more slave encapsulator devices;
   receiving feedback from the one or more slave encapsulator devices, the feedback comprising an evaluation of the preliminary plan at the one or more slave encapsulator devices;
   updating the preliminary plan with the feedback received from the one or more slave encapsulator devices to generate a finalized plan;
   generating a finalized mapping stream that comprises updated information identifying an updated plurality of encoded packets of the source stream that are used to generate each of the packets of the master output stream according to the finalized plan;
   sending the finalized mapping stream from the master encapsulator device to the one or more slave encapsulator devices; and
   at each of the one or more slave encapsulator devices, using the updated information in the finalized mapping stream to generate a slave output stream according to the finalized plan, wherein each slave output stream is identical to the master output stream.

2. The method of claim 1, wherein converting comprises applying a first one-to-one mapping function at the master encapsulator device to information contained in one or more fields of a packet in the source stream to produce a packet sequence number.

3. The method of claim 2, and further comprising applying a second one-to-one mapping function to information contained in one or more fields of a packet in the source stream to generate a timing reference for a packet in the master output stream in the second transport format.

4. The method of claim 3, wherein applying comprises applying a second one-to-one mapping function to information contained in one or more fields of a packet in the source stream to generate an initial timing reference, and further comprising generating timing references for subsequent packets in the master output stream based on the initial timing reference and a clock rate of content of the packets in the source stream.

5. The method of claim 1, wherein converting comprises generating an initial packet sequence number for a packet in the master output stream in the second transport format, and generating subsequent packet sequence numbers for subsequent packets in the master output stream from the initial packet sequence number.

6. The method of claim 1, and further comprising generating a source stream identifier for the slave output stream at each of the one or more slave encapsulator devices from information contained in packets of the source stream such that the slave output stream from each of the one or more slave encapsulator device has the same source stream identifier for the same source stream.

7. The method of claim 6, wherein generating the source stream identifier for the slave output stream comprises applying a one-to-one mapping function to information contained in one or more fields of the source packets of the source stream.

8. The method of claim 6, wherein receiving the source stream comprises receiving a multicast session for a channel of video programming, wherein each channel of video programming of a plurality of channels is identified by a source address and a destination multicast address such that the source address is identical across multiple channels and the destination address is unique for each channel, and wherein generating the source identifier is based on a combination of the destination multicast address and the source address.

9. The method of claim 8, wherein generating the source identifier comprises applying a one-to-one mapping function to a combination of the destination multicast address and the source address.

10. The method of claim 1, wherein the source stream comprises an MPEG2 transport stream and the output stream comprises a real-time transport protocol (RTP) stream.

11. The method of claim 10, wherein the information identifying the plurality of the encoded packets of the source stream that are used to generate each of the packets of the master output stream identifies each encoded packet of the MPEG2 transport stream with a packet identifier and an MPEG2 continuity counter.

12. The method of claim 1, wherein converting comprises generating one or more fundamental identifying characteristics for the master output stream such that one or more fundamental identifying characteristics for each one of the slave output streams generated by the one or more slave encapsulator devices is the same.

13. A device comprising:
a network interface unit configured to receive a source stream of encoded packets in a first transport format; and
a processor coupled to the first network interface unit, wherein the processor is configured to:
generate a preliminary plan for converting the encoded packets of the source stream to packets of a master output stream in a second transform format for communication over a data network, wherein the preliminary plan identifies a plurality of the encoded packets of the source stream corresponding to each packet of the master output stream;
generate a preliminary mapping stream that comprises information identifying the plurality of the encoded packets of the source stream that are used to generate each of packets of the master output stream according to the preliminary plan;
cause the network interface unit to send the preliminary mapping stream to one or more slave encapsulator devices;
receive via the network interface unit, feedback from the one or more slave encapsulator devices, the feedback comprising an evaluation of the preliminary plan at the one or more slave encapsulator devices;
update the preliminary plan with the feedback to generate a finalized plan;
generate a finalized mapping stream that comprises updated information identifying an updated plurality of encoded packets of the source stream that are used to generate each of the packets of the master output stream according to the finalized plan; and
cause the network interface unit to send the finalized mapping stream to the one or more slave encapsulator devices so that each of the one or more slave encapsulator devices uses the updated information in the finalized mapping stream to generate a slave output stream that is identical to the master output stream.

14. The device of claim 13, wherein the processor is configured to generate a packet sequence number for each packet in the master output stream by applying a first one-to-one mapping function to information contained in one or more fields of a packet in the source stream.

15. The device of claim 14, wherein the processor is further configured to apply a second one-to-one mapping function to information contained in one or more fields of a packet in the source stream to generate a timing reference for a packet in the master output stream in the second transport format.

16. The device of claim 13, wherein the processor is further configured to generate a source stream identifier for the master output stream from information contained in a packet of the source stream.

17. A non-transitory processor readable memory medium encoded with instructions that, when executed by a processor, cause the processor to:
receive at a master encapsulator device, a source stream of encoded packets in a first transport format;
generate a preliminary plan for converting the encoded packets of the source stream to packets of a master output stream in a second transport format for communication over a data network, wherein the preliminary plan identifies a plurality of the encoded packets of the source stream corresponding to each packet of the master output stream;
generate a preliminary mapping stream that comprises information identifying the plurality of the encoded packets of the source stream that are used to generate each of the packets of the master output stream according to the preliminary plan;
send the preliminary mapping stream to one or more slave encapsulator devices;
receive feedback from the one or more slave encapsulator devices, the feedback comprising an evaluation of the preliminary plan at the one or more slave encapsulator devices;
update the preliminary plan with the feedback to generate a finalized plan;
generate a finalized mapping stream that comprises updated information identifying an updated plurality of encoded packets of the source stream that are used to generate each of the packets of the master output stream according to the finalized plan; and
send the finalized mapping stream to the one or more slave encapsulator devices so that each of the one or more slave encapsulator devices can use the updated information in the updated mapping stream to generate a slave output stream that is identical to the master output stream.

18. The processor readable medium of claim 17, wherein the instructions that generate comprise instructions configured to generate a packet sequence number for a packet in the master output stream by applying a first one-to-one mapping function to information contained in one or more fields of a packet in the source stream.

19. The processor readable medium of claim 18, and further comprising instructions that, when executed by the processor, cause the processor to apply a second one-to-one mapping function to information contained in one or more fields of a packet in the source stream to generate a timing reference for a packet in the master output stream.

20. The processor readable medium of claim 17, and further comprising instructions, that when executed by the processor, cause the processor to generate a source stream identifier for the master output stream from information contained in a packet of the source stream.

* * * * *